June 21, 1949.   T. B. MONTGOMERY ET AL   2,473,721
CURRENT LIMITING SYSTEM FOR WARD-LEONARD DRIVES
Filed Dec. 18, 1943   2 Sheets-Sheet 1
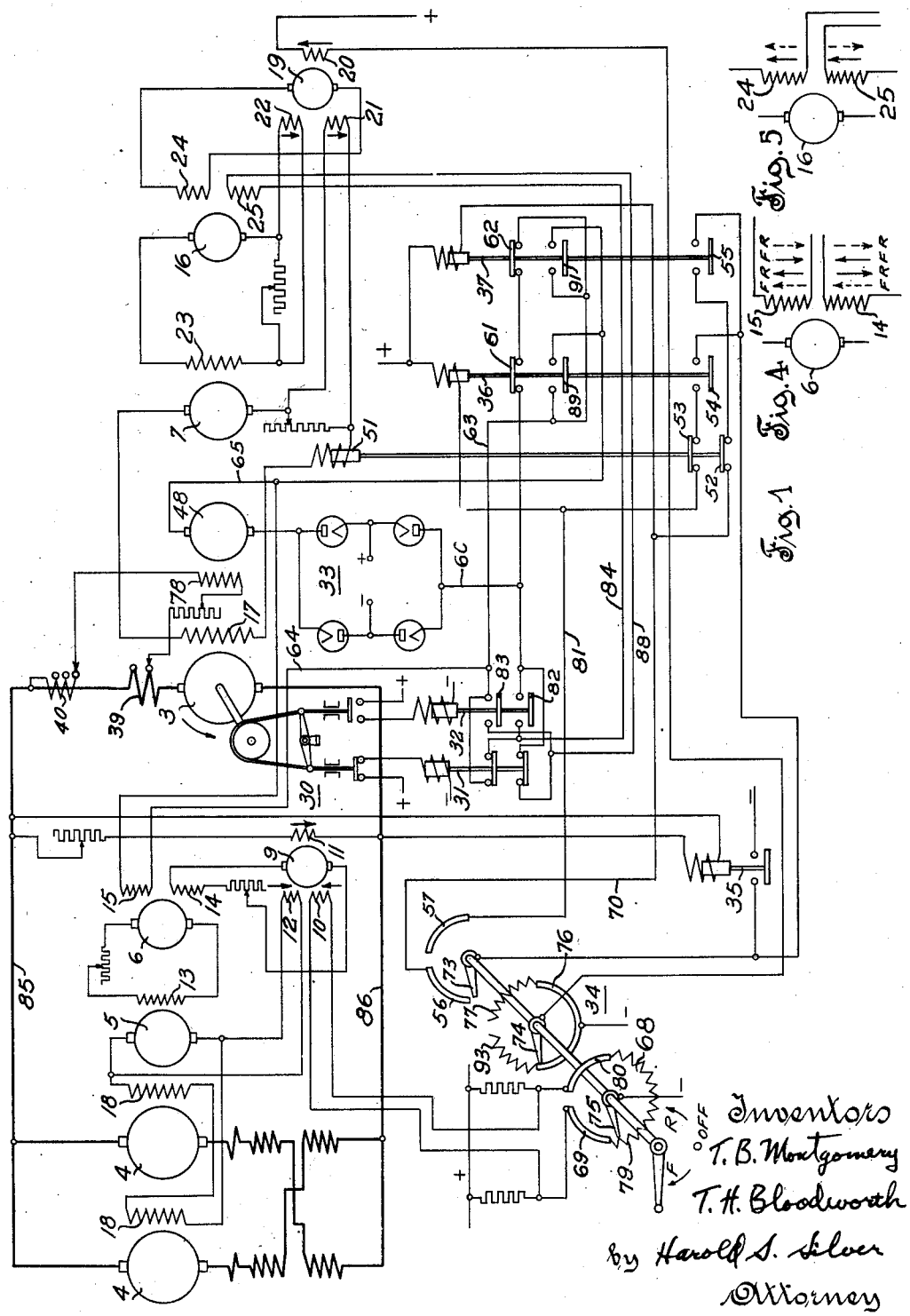

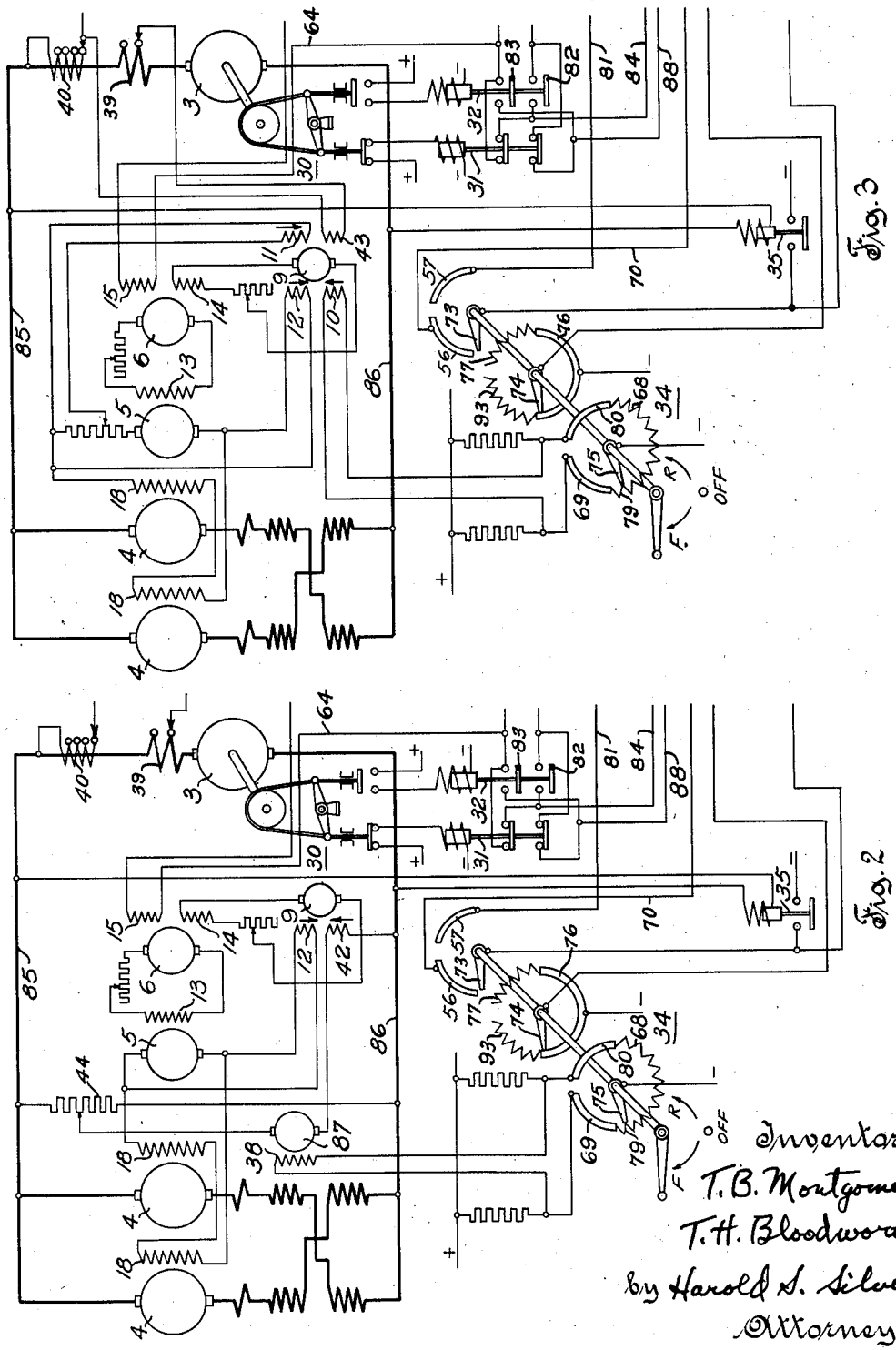

Patented June 21, 1949

2,473,721

UNITED STATES PATENT OFFICE 2,473,721

CURRENT LIMITING SYSTEM FOR WARD-LEONARD DRIVES

Terryl B. Montgomery, Wauwatosa, and Thomas H. Bloodworth, Waukesha, Wis., assignors to Allis-Chalmers Manufacturing Company, Milwaukee, Wis., a corporation of Delaware Application December 18, 1943, Serial No. 514,797

12 Claims. (Cl. 318—154)

This invention relates in general to a control system for a dynamo electric machine and relates particularly to a control system for obtaining rapid acceleration or deceleration of a motor.

In prior art control systems of the type used to reverse large motors used in blooming or slabbing mills, the time necessary to reverse a five thousand horsepower motor was substantial and of the order of ten to fifteen seconds. Switching devices were used to control the heavy currents involved in such a reversing operation. In blooming or slabbing mills, the metal billet is run through the rolls a great number of times, first in one direction and then the other, and, therefore, any saving in reversing time would permit considerably increased production.

Prior art Ward-Leonard controls, in which the generator voltage is raised (with full motor field) to raise the motor speed from zero to a base speed and in which the motor field is weakened (with constant generator voltage) to raise the motor speed from base speed to full speed, have been inadequate to obtain low reversing times. In such control systems sudden torque variations accompanied each control change.

It is therefore an object of the present invention to provide a control system for a generator supplied motor whereby the motor may be reversed in minimum time without damage to the machines by reason of excess current.

It is also an object of the present invention to provide a control system for a dynamo electric machine whereby the field current of such machine may be rapidly changed to attain a desired change in a characteristic of such machine in a minimum of time without overshooting the desired value.

Another object of this invention is to obtain minimum reversing time for a generator supplied motor by maintaining a substantially constant current flow between motor and generator during the entire reversing cycle.

It is another object of the present invention to provide a dynamo electric machine with a reversing control utilizing a control exciter energized responsively to the differential between a reference voltage source and a voltage source proportional to the voltage of the machine controlled.

Objects and advantages other than those above set forth will be apparent from the following description when read in connection with the accompanying drawing, in which:

Fig. 1 is a schematic diagram of connections of a control system embodying the present invention;

Fig. 2 is a schematic diagram of connections showing a modification of the generator control illustrated in Fig. 1;

Fig. 3 is a schematic diagram of connections showing another modification of the generator control illustrated in Fig. 1; and Figs. 4 and 5 illustrate the relationship of the energization of the field windings of certain machines shown in Figs. 1, 2 and 3.

In the drawings, the motor 3 has its armature connected directly across the armatures of generators 4. Motor 3 may be reversed by reversing the voltage of generators 4 and may be controlled from zero up to a base speed by control of voltage of generators 4 and from base speed up to full speed (with full generator voltage) by weakening of the field 17 of the motor 3. Two generators 4 are illustrated in the drawing as having series fields connected for cross compensation in a well known manner. Two machines 4 are used in place of one machine in order to use smaller machines, however, a single machine could be substituted for the two generators 4.

The voltage across the generators 4 is controlled both as to magnitude and direction by control of a train of machines providing several stages of amplification. These machines include generator exciter 5 supplying field current to the fields 18 of the generators 4, control exciter 6 for supplying current to the field 13 of generator exciter 5 and an auxiliary control or pilot exciter 9 for controlling the current in a field 14 on the control exciter 6. Small changes in the excitation of the pilot exciter 9 produce greatly amplified changes in the fields 18 and the generators 4.

The pilot exciter 9 is controlled by control of its setting field 10 connected to a resistance bridge controlled by the mill master controller 34. The setting field 10 is opposed and substantially balanced by a field 11 connected directly across the power conductors 85, 86 connecting the generators 4 and the motor 3. A recall field 12 is provided on pilot exciter 9 and energized responsively to the voltage of exciter 5. The effect of recall field 12 on the terminal voltage of the pilot exciter 9 is opposed to the effect of the setting field 10. This recall field 12 prevents overshooting of the main generator voltage when such voltage reaches its value as determined by movement of the mill master 34.

The relative effects of fields 10, 11 and 12 are shown by the arrows.

The motor 3 is similarly controlled during field weakening by a series of machines providing several stages of amplification. An exciter 7 supplies field current to the field 17 of the motor 3 and the exciter 7 is in turn controlled by the control exciter 16 supplying field current to the field 23. A pilot exciter 19 controls the current in field 24 of the control exciter 16 and has setting, balancing and recall fields 20, 21 and 22 similar to fields 10, 11 and 12 on the pilot exciter 9. The balancing field 21 is responsive to current in field 17 of motor 3, rather than to the voltage thereof, so as to measure the induced E. M. F. of the motor. The setting field 20 is controlled as to the magnitude of current therein by the mill master 34.

A switch 30 shown as mechanically controlled by the direction of rotation of the motor 3 has contacts controlling the energization of relay 31 or 32 dependent upon direction of rotation of motor 3. A voltage relay 35 is energized only if a predetermined voltage is present on the conductors 85, 86. An additional switch on the mill master 34 selectively controls, if relay 35 is energized, a relay 36 or relay 37 only when the mill master 34 is in motor field weakening position.

In order to limit the current exchange between generators 4 and motor 3, current limit fields 15 and 25 are supplied on the control exciters 6 and 16, respectively. One or the other of these current limit fields is energized, if the current in conductors 85, 86 exceeds a predetermined value, through a "spill-over" circuit involving generator 48 and a bridge rectifier circuit 33. The field 78 of the generator 48 is shown as being connected responsively to the voltage drop across the interpole winding 39 of the motor 3 and its excitation will therefore be a measure of the current exchanged between generators 4 and motor 3. If the terminal voltage of generator 48 exceeds that of a constant voltage source connected to the rectifier bridge 33, then current will flow in one or the other of the current limit fields 15 or 25 dependent upon the position of mill master 34, that is, whether the control is being effected by generator voltage change or by motor field change. Excitation of fields 15 or 25 opposes or aids the energization of fields 14 and 24, dependent upon whether motor 3 is accelerating or decelerating, thereby limiting the voltage supplied to generators 4 or to motor 3 to a predetermined safe value.

For example, starting with the motor 3 running in the arrow direction and the parts as shown in Fig. 1, if the mill master 34 be moved to off position, the following operation will take place. Operation of contact 74 during this movement of mill master 34 makes no change in the current in field 20 for contact 74 remains on contact segment 76. Voltage relay 35 has just dropped out to open its contacts. Movement of contact 75 on resistance segment 79 decreases the current in setting field 10 of pilot exciter 9. Reduction of the voltage of pilot exciter 9 rapidly reduces the voltages of machines 6 and 5 and, therefore, the voltage of generators 4. This voltage reduction continues until zero voltage is reached, thereby stopping motor 3.

This rapid reduction in voltage may be sufficient to cause current flow in conductors 85 and 86 greater than the maximum safe value of current allowable in machines 3 and 4. If the current in motor 3 exceeds such predetermined safe value, the current in the interpole winding 39 and auxiliary winding 40 is rapidly increased, to thereby increase the energization of field 78 of generator 48 so that the terminal voltage of generator 48 is greater than that of the constant voltage source connected to the rectifier bridge 33. Current will then flow in a circuit as follows: lower terminal of generator 48, source at rectifier bridge 33 from plus to minus, conductor 60, contacts 61 and 62 of relays 36 and 37, conductors 63 and 64, current limit field 15 on generator 6 and conductor 65 to the upper terminal of generator 48. The field 15 is energized in the direction of the dotted arrow F (as shown in Fig. 4) to aid field 14, thereby preventing such rapid decrease of the generator voltage that the current in the machines 3 and 4 becomes greater than the maximum safe value.

If the mill master 34 is then moved in a counterclockwise direction from the off position, contact 75 moves on resistance ring 68 to increase the current in setting field 10 in the reverse direction, thereby increasing the voltage on generator 4 in the reverse direction. The motor 3 builds up to base speed in the reverse direction. If the current in conductors 85, 86 becomes greater than the maximum safe value, current limit field 15 will be energized, as set forth below, to maintain current at or below such maximum safe value.

When the rotation of motor 3 changes to the reverse direction, relay 31 is deenergized and relay 32 is energized by operation of the direction responsive relay 30. Change in position of the contacts of relays 31 and 32 does not change the circuit for energization of current limit field 15 as above described. However, as the current in the field 14 of generator 6 has reversed and the motor 3 is accelerating, current in field 15 is in the full arrow R direction and, therefore, opposed the energization of field 14 (as shown in Fig. 4) to hold the current down to the maximum safe value.

Further counterclockwise movement of the mill master 34 makes no change in the setting field 10 of pilot exciter 9, for contact 75 is on the contact segment 80. Contact 74 moves on resistance ring 77, thereby weakening field 20 of pilot exciter 19 to rapidly raise the speed of motor 3 from base speed to top speed. Contact 73 of mill master 34 makes with contact 57 and the voltage relay 35 having picked up when voltage on conductors 85, 86 reaches a predetermined value, the coil of relay 36 is energized through a circuit from negative, contacts of relay 35, contacts 73 and 57, conductor 81, coil of relay 36 to positive. Energization of relay 36 opens contact 61 thereby breaking the circuit above traced for energization of current limit field 15 from generator 48. A circuit for energization of current limit field 25 of generator 16, by any excess of voltage of generator 48 over that of source 33, is set up from lower terminal of generator 48, rectifier bridge and source 33, conductor 60, contact 82 of relay 32, conductor 84, field 25, conductor 83, contact 83 of relay 32, conductor 62, contact 89 of relay 36, conductor 65 to upper terminal of generator 48.

If current in conductors 85, 86 exceeds the maximum safe value, current from windings 39 and 40 energizes field 78 of generator 48 sufficiently so that the voltage of generator 48 exceeds that of the constant voltage source at rectifier bridge 33 and current will flow in the above traced circuit, thereby energizing current limit field 25 in the full arrow direction to aid field 24 (as shown in Fig. 5) and increase the energization of field 17 until current in conductors 85, 86 is again at or below the maximum safe value.

If the motor 3 is to be decelerated from top speed to base speed, while running in the reverse direction, the current limit circuit for field 25 remains set up as above traced and energization of field 25 will oppose that of field 24, as shown by the dotted arrows in Fig. 5, to prevent too rapid an increase of energization of generator 16, whereby the current in motor 3 is increased beyond the maximum safe value. The direction of current in fields 78 and 25 is reversed from that obtaining when the motor 3 is running in the forward direction, for the direction of current in windings 39 and 40 is reversed because motor 3 is being decelerated and is pumping current back to generators 4.

As the motor 3 is further decelerated from base speed to zero speed while running in the reverse direction, the mill master 34 is moved in a clockwise direction to the "off" position. As contact 74 moves on contact segment 76, no further change is made in the energization of field 20, if the motor field current has increased to a predetermined value and relay 51 has picked up, thereby opening the sealing-in circuit for relays 36 or 37. Movement of contact 75 on resistance ring 68 decreases the energization of field 10 thereby decreasing the voltage across conductors 85, 86. Contact 73 breaks with contact 57 thereby deenergizing relay 36 and establishing a circuit for current limit field 15 as previously traced through contacts 61, 62 and conductors 63, 64 and 65. As the motor 3 is decelerating and is running in the reverse direction, the energization of fields 14 and 15 will be in the dotted arrow R direction and the energization of current limit field 15 will aid that of field 14 as shown in Fig. 4 to prevent too rapid a decrease in the voltage of generators 4.

Further clockwise movement of mill master 34 increases the current in field 10 in the arrow or forward direction and the energization of field 14 of generator 6 is in the full arrow F direction. The circuit for the current limit field 15 is the same as traced in the paragraph next above and the energization of field 15, upon excess current is in the full arrow F direction and opposes the energization of field 14 to hold down the increase of energization of machine 6 and thereby maintain current in the motor 3 within the maximum safe value.

To increase the speed of motor 3 from base speed to top speed, with the motor running in the forward direction, the mill master 34 is moved from the position shown in a clockwise direction. As contact 75 of mill master 34 makes with and remains on contact segment 69, no further change in energization of field 10 is made after voltage relay 35 picks up. Making of contacts 73 and 56 of mill master 34 picks up relay 37 through a circuit from negative, contacts of relay 35, contacts 73 and 56 of mill master 34, conductor 70, coil of relay 37 to positive. Energization of relay 37 opens contact 62 and closes contact 91. During this operation relays 32 and 36 are deenergized and relay 31 is energized. The above traced circuit for current limit field 25 of generator 16 is broken at contact 89 of relay 36, however, this same circuit is set up through contact 91 of relay 37, which is in parallel with contact 89. Spill-over current of generator 48 is therefore applied to field 25 of generator 16 in the full arrow direction, as shown in Fig. 5, to aid field 24 and providing for motor current up to but not exceeding the maximum safe value.

When it is desired to reduce the speed of motor 3 from top speed to base speed when running in the forward or arrow direction, movement of contact 74 on the resistance ring 93 increases the current in field 20. As the motor 3 is pumping back current to the generators 4, energization of field 78 will be in the reverse direction to that obtaining when the motor 3 was accelerating in the forward direction. The circuit for current limit field 25 remains the same except that the current in field 25 will be reversed as shown by the dotted arrow in Fig. 5, and energization of field 25 will oppose that of field 24 to prevent too great an increase of field current such as will overload the motor 3 beyond the maximum safe current value.

In attempting to secure fast speed reversal by fast flux and voltage change in motor 3 and generators 4, certain difficult problems of control are encountered, the solution to which were only roughly approached in the prior art. Utilization of the machine material to its fullest extent from the economy standpoint necessitates a high degree of saturation in the field windings at full excitation. However, as the current change in the excitation windings, with a given voltage applied, is not uniform with time, and as inductance is proportional to flux change per ampere of excitation, the flux lag behind the applied voltage differs with the degree of excitation. These factors brought about exceedingly complicated flux, voltage and current functions and relationships during the reversing cycle, which precluded prior art investigators from visualizing and computing accurate analyses of the problem.

It is found that if a control be utilized which will vary the voltage on the generator fields 18, from zero speed to base speed, so as to vary the exciting current and flux at such rate as will hold constant current in the armature of motor 3 at a predetermined maximum safe value from zero to full voltage on generators 4 (with full field on motor 3) and thereafter to hold constant voltage on the generators 4 and vary the voltage on the field 17 of motor 3 so as to similarly hold such maximum safe value of motor armature current from base speed to full speed, acceleration will be accomplished in the minimum time with the least stress on the machinery by sudden torque variations.

By use of the trains of amplifying machines a great forcing voltage may be applied to effect reversal of motor 3. These machines can therefore be adjusted to change generator voltage and motor field flux faster than necessary to provide maximum safe motor torque. The current limit means provided by the "spill-over" circuit effected by rectifying bridge 33 and machine 48 prevents the current in motor 3 from exceeding its maximum safe value. The motor current during the reversing cycle is therefore maintained constant at its maximum safe value, thereby permitting reversal of the motor 3 in minimum time.

During normal operation of the motor 3, pilot exciter 9 functions to maintain the voltage of generators 4 at a constant value determined by the net excitation of fields 10, 11 and 12. Pilot exciters 9 and 19 may each have a reduced magnetic circuit such that each will operate below the knee of its saturation curve during normal operation and above the knee of its saturation curve during reversing change, as is fully described and claimed in a copending application of T. B. Montgomery and C. O. Weilbaecher, Serial No. 514,796, filed December 18, 1943, now Patent No. 2,397,152, granted March 26, 1946.

The current limiting means above described is entirely ineffective when the value of current in conductors 85, 86 is below the maximum safe value, but becomes sharply effective immediately above such value. During acceleration relays 31, 32, 36 and 37 connect the field winding 15 for current limit control at any generator voltage control position of the mill master 34, providing relay 35 has not closed its contacts; and connect field 25 for such operation at any motor field changing position of mill master 34, if voltage relay 35 has closed its contacts. Upon deceleration, these same relays connect field winding 25 for current limit control at any motor field changing position of the mill master 34 if relay 51 has not picked up its contacts; and connect field 15 for such operation at any generator voltage control position of the mill master, after current in field 17 has reached a predetermined value and relay 51 has picked up. While current in field 17 is below a predetermined value, relay 51, having contacts 52 and 53 in series with contacts 55 and 54 on relays 36 and 37, shunts the additional switch contacts 56 or 57 on the mill master 34, thereby sealing in relays 36 or 37 until current in field 17 reaches such predetermined value. Relays 36 and 37 may have conventional prior art interlock contacts preventing simultaneous changes in fields 19 and 20 by the mill master 34. The effect of the "spill-over" circuit on field 25 is reversed, upon reversal of motor 3, by means of relay 30.

An auxiliary winding 40 is connected in circuit with the field 78 of machine 48 and is energized in response to the rate of change of armature current in motor 3. A measure of the rate of change of motor armature current is desirable for control purposes. The voltage drop across the interpole winding 39 has been used to measure the armature current, however, in such voltage drop, the component of current proportional to current magnitude is in fixed ratio to the current component proportional to rate of change of current, dependent upon the self-inductance of the interpole winding. By providing taps, as shown, in the usual interpole circuit, the magnitude of both components may be varied, but without changing the ratio between them.

By combining the voltage drop across interpole winding 39 with that of winding 40 (which may itself be tapped as shown), complete and independent control is had of both the rate of change component and the magnitude component of the control voltage. Winding 40 may be used, if connected in one direction relative to winding 39, to obtain greater accuracy by avoiding error due to inductance in the interpole winding 39, and if reversed relative to winding 39, to gain accelerated response of the machine 48. Winding 40 may be wound to link approximately the same flux as interpole winding 39.

In the modification illustrated in Fig. 2, only the modified portion of the control system of Fig. 1 has been shown. In this modification, the pilot exciter 9 has a field 42 energized by the differential between the voltage of a generator 87 and the voltage drop across a resistor 44 connected across the power conductors 85, 86. By means of a field 38 on the generator 87 connected to a resistance bridge controlled by the mill master 34, the voltage of the generator 87 is controlled both as to magnitude and direction.

In this modification no balancing of magnetomotive forces in the pilot exciter 9 is effected, the control being obtained by a balancing of the voltage of the generator 87, utilized as a reference, against the voltage drop in resistor 44 which is a measure of the voltage across the conductors 85, 86.

In the modification shown in Fig. 3, the setting field 10 of the pilot exciter 9 is connected for control both in magnitude and direction to the mill master 34 as in Fig. 1. The recall field 12 is similarly connected responsively to the voltage of exciter 5 as in Fig. 1. The balancing field 11 is not connected across the power conductors 85, 86 but is connected in a manner similar to the balancing field 21 of the motor pilot exciter 19 in Fig. 1, that is, connected so as to respond to the field current in the machine 5. This permits the use of a lower voltage field winding 11 and permits the pilot exciter 9 to be a lower voltage machine. A load compensating field 43 on pilot exciter 9 energized from the voltage drop across windings 39 and 40, may be utilized to maintain voltage on generators 4 either constant independently of current change due to load on motor 3, or with a rising or drooping characteristic with increase in load on motor 3. This load compensating field 43 can be used in the systems of Figs. 1 and 2 to obtain a rising or drooping generator voltage characteristic.

Although but three embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. A control system comprising in combination an adjustable voltage generator, an electric motor having its armature connected across the armature of said generator, means for controlling the current exchanged between said motor and said generator comprising a first dynamo electric machine connected to supply excitation current to said generator and a second dynamo electric machine connected to supply excitation current to said motor, means for controlling said dynamo-electric machines during speed change of said motor to cause said excitation currents to be available in a value in excess of that necessary to supply maximum safe current to said motor, limit means controlled in accordance with the current exchanged between said motor and generator for limiting said current to said predetermined maximum safe value, and means for selectively connecting said limit means so as to operably effect limitation of said supply of field excitation to said motor or said supply of field excitation to said generator.

2. A control system comprising in combination an adjustable voltage generator, an electric motor having its armature connected across the armature of said generator, means for controlling the current exchanged between said motor and said generator comprising a first dynamo electric machine connected to supply excitation current to said generator and a second dynamo electric machine connected to supply excitation current to said motor, means for controlling said dynamo electric machines during speed change of said motor to cause said excitation currents to be available in a value in excess of that necessary to supply maximum safe current to said motor, limit means controlled in accordance with the current exchanged between said motor and generator for limiting said current to said predetermined maximum safe value, and means for selectively connecting said limit means so as to operably effect limitation of said supply of field excitation to said motor or said supply of field excitation to said generator, said means including a translating device responsive to a predetermined voltage supplied by said generator to said motor.

3. A control system comprising in combination an adjustable voltage generator, an electric motor having its armature connected across the armature of said generator, means for controlling the current exchanged between said motor and said generator comprising a first dynamo electric machine connected to supply excitation current to said generator and a second dynamo electric machine connected to supply excitation current to said motor, means for controlling said dynamo electric machines during speed change of said motor to cause said excitation currents to be available in a value in excess of that necessary to supply maximum safe current to said motor, limit means controlled in accordance with the current exchanged between said motor and generator for limiting said current to said predetermined maximum safe value, and means for selectively connecting said limit means so as to operably effect limitation of said supply of field excitation to said motor or said supply of field excitation to said generator, said means including a translating device responsive to the direction of rotation of said motor.

4. A control system comprising in combination an adjustable voltage generator, an electric motor having its armature connected across the armature of said generator, means for controlling the current exchanged between said motor and said generator comprising a first dynamo electric machine connected to supply excitation current to said generator and a second dynamo electric machine connected to supply excitation current to said motor, means for controlling said dynamo electric machines during speed change of said motor to cause said excitation currents to be available in a value in excess of that necessary to supply maximum safe current to said motor, limit means controlled in accordance with the current exchanged between said motor and generator for limiting said current to said predetermined maximum safe value, and means for selectively connecting said limit means so as to operably effect limitation of said supply of field excitation to said motor or said supply of field excitation to said generator, said means including a translating device responsive to a predetermined field excitation on said motor.

5. A control system comprising in combination a variable voltage generator, a motor connected for exchanging armature current with said generator, a first pilot exciter for controlling a supply of field excitation to said generator, a second pilot exciter for controlling a supply of field excitation to said motor, setting fields on said pilot exciters, balancing fields on said pilot exciters operable in opposed relation to said setting fields, means for controlling the energization of said balancing field on said first pilot exciter responsively to an electrical characteristic of said generator, means for controlling the energization of said balancing field on said second pilot exciter responsively to an electrical characteristic of said motor, and means for applying a predetermined excitation to said setting fields to effect rapid change in the speed of said motor.

6. A control system comprising in combination a variable voltage generator, a motor connected for exchanging armature current with said generator, a first pilot exciter for controlling a supply of field excitation to said generator, a second pilot exciter for controlling a supply of field excitation to said motor, setting fields on said pilot exciters, balancing fields on said pilot exciters operable in opposed relation to said setting fields, means for controlling the energization of said balancing field on said first pilot exciter responsively to an electrical characteristic of said generator, means for controlling the energization of said balancing field on said second pilot exciter responsively to an electrical characteristic of said motor, controller means for applying predetermined excitation to said setting fields to effect rapid change in the speed of said motor, and limiting means responsive to a predetermined value of current exchanged between said motor and said generator for limiting said current to said predetermined value.

7. A control system comprising in combination an adjustable voltage generator, an electric motor having its armature connected across the armature of said generator, means for controlling the current exchanged between said motor and said generator comprising a dynamo electric machine connected to supply excitation current to said generator, means for controlling said dynamo electric machine during speed change of said motor to cause said excitation current to be available in a value in excess of that necessary to supply maximum safe current to said motor, limit means controlled in accordance with the current exchanged between said motor and generator for limiting said current to said predetermined maximum safe value, and means for modifying the response of said limit means in accordance with the rate of change of said current exchanged between said motor and said generator.

8. A control system comprising in combination a variable voltage generator, an electric motor having its armature connected across the armature of said generator, an exciter connected to supply field excitation to said generator, a control exciter connected to supply field excitation to said exciter, a pilot exciter connected to supply field excitation to said control exciter, a reference field on said pilot exciter, a balancing field on said pilot exciter energized responsively to voltage supplied by said generator to said motor, a recall field on said pilot exciter connected responsively to the voltage of said exciter, and a limit field on said control exciter controlled in accordance with the current exchanged between said motor and generator for limiting said current to a predetermined maximum value.

9. In a control system, the combination of a generator comprising an armature and a field winding, a motor comprising an armature connected to said generator armature and a field winding, means for supplying excitation current to said generator field winding, means for supplying excitation current to said motor field winding, a control device actuable into a plurality of generator field control positions for varying the value of said generator field excitation current to vary the speed of said motor in one direction of rotation, said device also being actuable into a plurality of motor field control positions for varying the value of said motor field excitation current to further vary the speed of said motor in said direction of rotation, limit means responsive to rise of the magnitude of the current flow through said armatures above a predetermined value, and means including an element actuable in response to movement of said control device from one of said generator field control positions into one of said motor field control positions for operatively connecting said limit means to said motor excitation current supply means to modify the action of said control device, whereby the current flow through said armatures is limited to substantially said predetermined value.

10. In a control system, the combination of a generator comprising an armature and a field winding, a motor comprising an armature connected to said generator armature and a field winding, means for supplying excitation current to said generator field winding, means for supplying excitation current to said motor field winding, a control device actuable into a plurality of generator field control positions for varying the value of said generator field excitation current to vary the speed of said motor in one direction of rotation, said device also being actuable into a plurality of motor field control positions for varying the value of said motor field excitation current to further vary the speed of said motor in said direction of rotation, limit means responsive to rise of the magnitude of the current flow through said armatures above a predetermined value, and means including an element actuable in response to movement of said control device from one of said motor field control positions into one of said generator field control positions for operatively connecting said limit means to said generator excitation supply means to modify the action of said control device, whereby the current flow through said armatures is limited to substantially said predetermined value.

11. In a control system, the combination of a generator comprising an armature and a field winding, a motor comprising an armature connected to said generator armature and a field winding, means for supplying excitation current to said generator field winding, means for supplying excitation current to said motor field winding, a control device actuable into a plurality of generator field control positions for varying the value of said generator field excitation current to vary the speed of said motor in one direction of rotation, said device also being actuable into a plurality of motor field control positions for varying the value of said motor field excitation current to further vary the speed of said motor in said direction of rotation, limit means responsive to rise of the magnitude of the current flow through said armatures above a predetermined value, and means including an element actuable in response to movement of said control device from one of said motor field control positions into one of said generator field control positions and including means responsive to a measure of said motor field excitation for operatively connecting said limit means to said generator excitation supply means to modify the action of said control device, whereby the current flow through said armatures is limited to substantially said predetermined value.

12. In a control system, the combination of a generator comprising an armature and a field winding, a motor comprising an armature connected to said generator armature and a field winding, means for supplying excitation current to said generator field winding, means for supplying excitation current to said motor field winding, a control device actuable into a plurality of generator field control positions for varying the value of said generator field excitation current to vary the speed of said motor in one direction of rotation, said device also being actuable into a plurality of motor field control positions for varying the value of said motor field excitation current to further vary the speed of said motor in said direction of rotation, limit means responsive to rise of the magnitude of the current flow through said armatures above a predetermined value, and means including an element actuable in response to movement of said control device from one of said generator field control positions into one of said motor field control positions and including means responsive to a measure of said generator field excitation for operatively connecting said limit means to said motor excitation current supply means to modify the action of said control device, whereby the current flow through said armatures is limited to substantially said predetermined value.

TERRYL B. MONTGOMERY.
THOMAS H. BLOODWORTH.

REFERENCES CITED

The following references are of record in the file of this patent:

UNITED STATES PATENTS

| Number | Name | Date |
|---|---|---|
| 865,822 | Bogen | Sept. 10, 1907 |
| 901,514 | Alexander | Oct. 20, 1908 |
| 1,174,772 | Steiner | Mar. 7, 1916 |
| 1,411,043 | Lammers | Mar. 28, 1922 |
| 1,985,000 | Sykes | Dec. 18, 1934 |
| 2,082,816 | Adams et al. | June 8, 1937 |
| 2,205,204 | King | June 18, 1940 |
| 2,255,488 | Huston | Sept. 9, 1941 |
| 2,301,689 | Edwards et al. | Nov. 10, 1942 |